United States Patent [19]

Thomas et al.

[11] Patent Number: 4,642,617

[45] Date of Patent: Feb. 10, 1987

[54] ACOUSTIC TOOL BREAK DETECTION SYSTEM AND METHOD

[75] Inventors: Charles E. Thomas, Scotia; Minyoung Lee, Schenectady; James F. Bedard, Schenectady; Steven R. Hayashi, Schenectady, all of N.Y.

[73] Assignee: General Electric Company, Schenectady, N.Y.

[21] Appl. No.: 685,005

[22] Filed: Dec. 21, 1984

[51] Int. Cl.⁴ .............................................. G08B 21/00
[52] U.S. Cl. ................................... 340/680; 340/683; 73/104; 73/660
[58] Field of Search ................. 340/679, 680, 683; 73/104, 660, 593, 658; 364/475, 507, 508, 550, 551

[56] References Cited

U.S. PATENT DOCUMENTS

| | | | |
|---|---|---|---|
| 3,793,627 | 2/1974 | Darrel et al. | 73/104 X |
| 3,841,149 | 10/1974 | Edwin | 73/104 |
| 3,842,663 | 10/1974 | Harting et al. | 73/67.2 |
| 3,979,739 | 9/1976 | Birchall | 73/660 |
| 4,087,801 | 5/1978 | Noh | 73/104 X |
| 4,563,897 | 1/1986 | Moore | 73/104 |

*Primary Examiner*—James L. Rowland
*Assistant Examiner*—Jeffery A. Hofsass
*Attorney, Agent, or Firm*—Donald R. Campbell; James C. Davis, Jr.; Paul R. Webb, II

[57] ABSTRACT

Substantial cutting condition changes that occur gradually, as opposed to the more usual sudden large change, are detected by setting upper and lower cutting noise mean level thresholds. When the mean cutting noise exceeds the upper threshold or stays below the lower threshold for a preset number of signal samples, a tool break alarm is generated. Techniques are given to reduce false alarms at the start and end of the cut and on runout on initial rough surface cuts. The system comprises an accelerometer or other sensor whose signal is preprocessed to attenuate lower frequency machinery noise and detect the signal energy in a band below 100 KHz, then sampled, and the digitized signal samples analyzed by pattern recognition logic.

10 Claims, 7 Drawing Figures

SAMPLES OF PROCESSED ANALOG SIGNAL

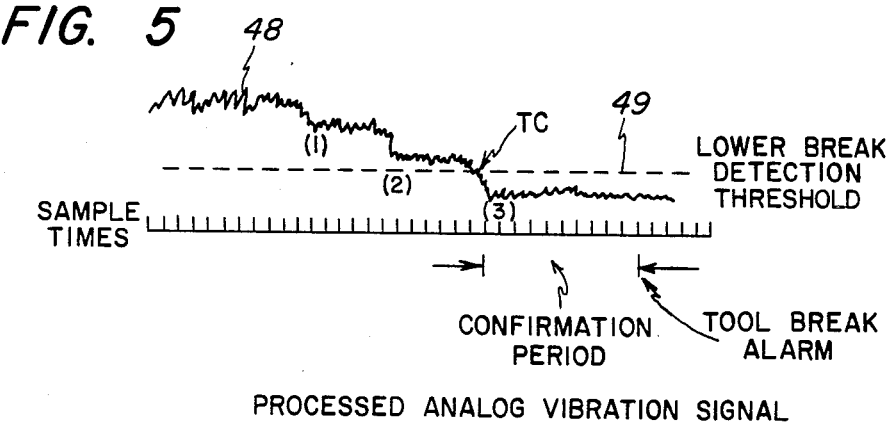
FIG. 5 PROCESSED ANALOG VIBRATION SIGNAL
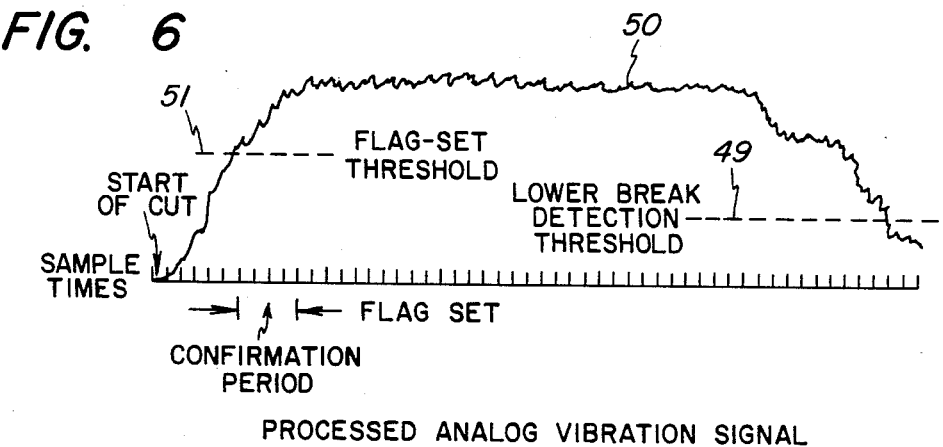
FIG. 6 PROCESSED ANALOG VIBRATION SIGNAL
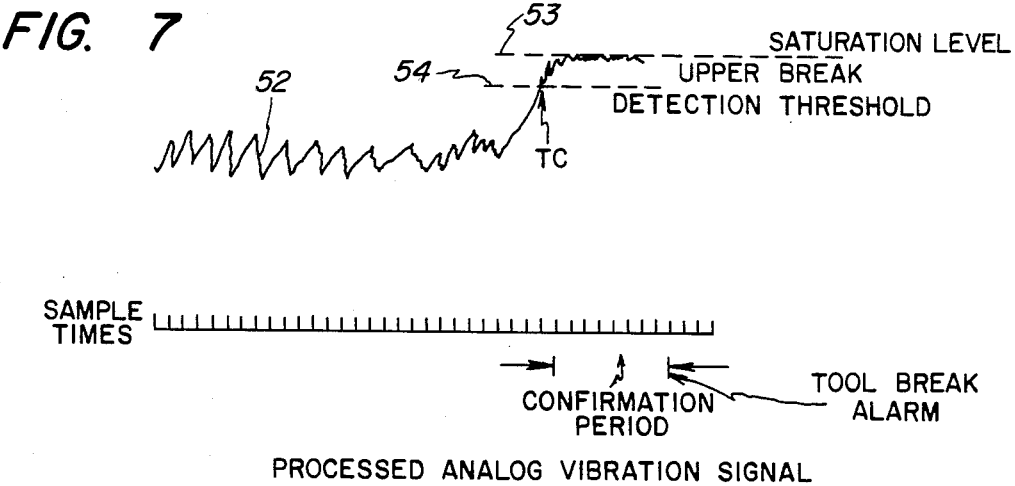
FIG. 7 PROCESSED ANALOG VIBRATION SIGNAL

ACOUSTIC TOOL BREAK DETECTION SYSTEM AND METHOD

The Government has rights to this invention pursuant to Contract No. F33657-83-C-2065 awarded by the Air Force.

BACKGROUND OF THE INVENTION

This invention relates to a system and method for acoustically detecting tool break events in machining operations that produce major cutting condition changes occurring over a period of time.

Significant breakage of a cutting insert, threatening immediate damage to the workpiece or machine tool or serious enough to force a recut, and evidenced by a large and abrupt change in cutting noise that persists for a minimum confirmation period, is detected as disclosed in application Ser. No. 664,188 filed Oct. 24, 1984, C. E. Thomas et al, "Acoustic Monitoring of Cutting Conditions to Detect Tool Break Events". A high frequency vibration sensor monitors both acoustic emissions produced by tool fracture and cutting vibration noise. A microcomputer analyzes the processed vibration signal via amplitude-time domain pattern recognition techniques to separate major tool break events from both minor tool break events and various sources of potential false alarms. The acoustic frequency band is chosen to discriminate against lower frequency machinery noise below about 30 KHz and avoid the use of high frequencies above 100 KHz. A broken tool alarm to stop cutting is not issued on a detected abrupt increase or decrease in signal level unless a persistent change in cutting noise indicates a substantial change in cutting conditions.

Extensive machining experiments have shown that large changes in cutting noise level and cutting conditions due to tool break events do not always occur abruptly in a single step increase or decrease. The total change may take place more gradually, or as a series of small abrupt steps. Changes of these latter two types may fail to meet the break detection criteria of the system of Ser. No. 664,188, but may accompany tool break events capable of significantly damaging a workpiece. A system is needed for detecting these less sudden cutting condition changes without introducing a significant increase in false alarm rate.

Another related copending application is Ser. No. 664,189, filed Oct. 24, 1984, Thomas et al, "Acoustic Detection of Tool Break Events in Machine Tool Operations". This approach generally relies on detecting the tool fracture signal before checking for a cutting noise signal change. The pattern recognition logic makes a three step check of the processed vibration signal before generating an alarm. A positive-going signal transient that may have its source in a break event triggers a mean shift detector to check for a change in cutting noise; if the mean shift persists for a given period the alarm is set off. The present system uses the same acoustic sensor and analog signal processing as these copending applications, but like the first emphasizes detection and interpretation of changes in the cutting noise, rather than detection of acoustic emissions produced by tool fracture.

SUMMARY OF THE INVENTION

An object of the invention is to enable an acoustic tool monitoring sytem to reliably detect tool breaks that cause significant changes in cutting conditions, even though those changes may take place over a period of time and not suddenly.

Another object is to accomplish the foregoing without materially increasing the system false alarm rate, such as can occur due to rough surface cutting.

Yet another object is to provide an improved tool break detection system that is easily integrated with an acoustic tool touch detector in a combined system.

Under a few machining conditions there is a decrease in cutting noise level occurring gradually over a considerable period of time caused, for instance, by a reduction in depth of cut in small steps as the cutting edge breaks away via repeated small breaks rather than one large break. Tool break events sometimes cause an increase in depth of cut, and the cutting noise rises to very high levels, rather than decreasing. Reliable detection capability is extended to these types of tool break events.

The components of the system include a broadband vibration sensor, such as an accelerometer which is most sensitive to frequencies around a resonant frequency, positioned on the machine tool to sense vibrations at the tool-workpiece interface during the machining process. An analog preprocessor for the sensor signal is comprised of means to discriminate against lower frequency machinery noise, and a rectifier and low-pass filter to detect the signal energy in an acoustic frequency band between 30 KHz and 100 KHz. The 500 Hz or less cutoff frequency of the low-pass filter prevents aliasing from the subsequent sampling operation. The unipolar output signal of the analog preprocessor is sampled, and the samples converted to digital form and analyzed by digital pattern recognition circuitry, which may be a programmable general purpose computer.

Major cutting condition changes that occur gradually over a period of time are detected by setting lower and upper cutting noise mean level limits. The digital processor calculates the running mean signal level of a selected number of samples. Means are provided for determining when the mean signal level drops below or rises above these lower and upper break detection thresholds, and for generating a tool break alarm after the cutting noise mean signal level remains outside of either threshold for a preset number of consecutive signal samples.

The probability of false alarms on low level signals, such as near the start of the cut, is reduced by activating the lower limit threshold after a flag is set by a preset number of consecutive signal samples exceeding the much higher flag-set threshold. False alarms during rough surface cuts (alternate metal-cutting and air-cutting) are prevented by setting the number of low level cutting noise samples to alarm equal to or greater than the number of samples in a machine tool spindle revolution. False alarms which would otherwise occur at the end of the cut are blanked out by the machine control.

BRIEF DESCRIPTION OF THE DRAWINGS

FIG. 5 shows a processed signal at the output of the analog channel produced by a series of small breaks that causes the mean signal to drop below a lower threshold and generate an alarm.

FIG. 6 illustrates a processed analog vibration signal and setting a flag to activate the lower break detection threshold.

FIG. 7 shows generation of a tool break alarm if the processed signal exceeds an upper break detection threshold due to very high cutting noise.

DETAILED DESCRIPTION OF THE INVENTION

The cutting inserts or tools of metal-cutting lathes break under a variety of different machining conditions and these tool break events produce a variety of different vibration signal signatures. It is the objective of the Machine Tool Monitor tool break detector to analyze the vibration signals and separate those signal signatures caused by significant tool break events from those caused by either spurious signal sources or insignificant tool break events. The definition of a significant or major tool break event varies with the objective of the operator and the nature of the part he makes. However, it is usually the case that only a break that threatens immediate damage to the part or tool holder, or would force a recut, is considered significant. The tool break detector should ignore other tool breaks to avoid unnecessary interruption of the cutting process, and consequent reduced productivity.

In general, a tool break event produces a vibration signal with two parts, an acoustic emission in the form of one or more short spikes caused by the sudden cracking of the insert material, and a change in the cutting noise signal due to a change in the cutting conditions caused by the broken insert cutting differently from the unbroken insert. Concerning the latter, these cutting condition changes may be: reduced depth of cut due to loss of part of the insert; increased depth of cut due to a piece broken from the insert jamming against the workpiece; and increased workpiece surface roughness due to a jagged edge on the broken insert. This tool break system relies on monitoring changes in the cutting noise itself, rather than detecting the tool fracture acoustic signal. It is thus philosophically closer to schemes that monitor changes in machining power or forces than it is to any other known acoustic tool break detection system.

The mounting location of the vibration sensor for tool break detection is determined individually for each machine tool to be monitored. The sensor is mounted in good acoustic contact with a part of the machine tool sufficiently closely mechanically coupled to the tool holder so that vibrations generated at the tool-workpiece interface during the machining operation can be readily sensed. The machine tool monitor tool break detector uses a single sensor that is small and rugged and may be mounted a reasonable distance from the tool-workpiece interface. In contrast, many other prior tool break detection systems require multiple sensors and sensors mounted close to the cutting insert, where the environment is severe, only one tool position of a multiple-position machine can be serviced with one sensor, and sensor installation may not be a simple process.

Figure 1:
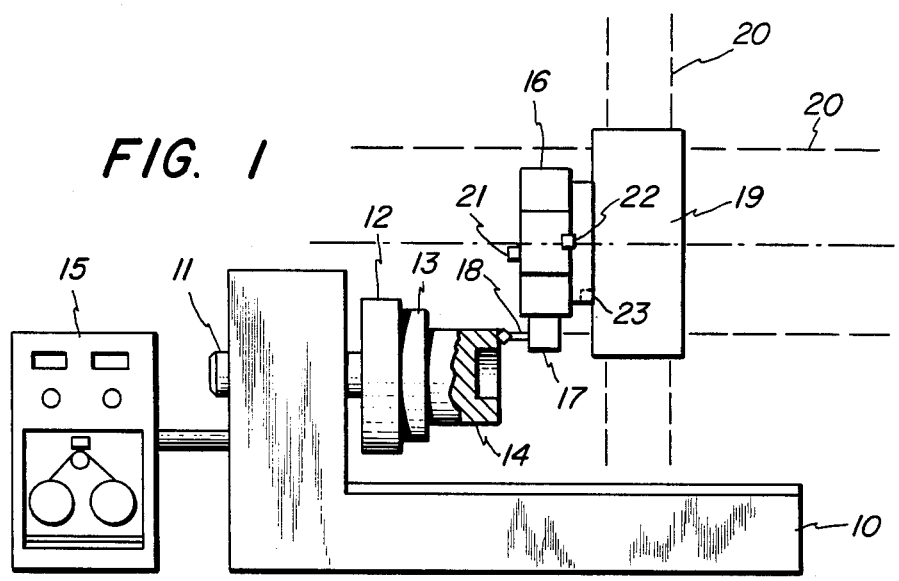
FIG. 1 is a partial elevational view of a horizontal turret lathe showing alternative positions of the accelerometer.
Figure 2:
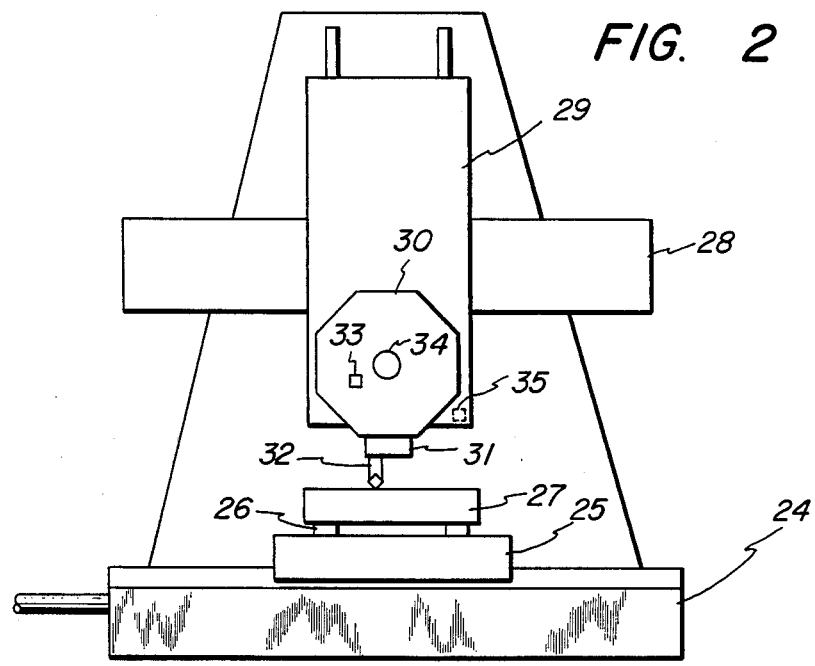
FIG. 2 is a simplified elevational view of a vertical turret lathe and alternative sensor positions.

FIGS. 1 and 2 are simplified drawings of horizontal and vertical turret lathes; the monitor has some applicability to other types of machine tools such as milling machines, machining centers, and drills. The portion of the horizontal turret lathe illustrated has a machine frame 10, spindle shaft 11, chuck 12, fixture 13 for holding the workpiece 14, and a NC control station 15. A rotatable tool turret 16 has several tool posts 17 to support the tool holder and insert 18. The turret 16 is supported on a turret mount 19 which in turn has movement along the two cross slides 20. A vibration sensor 21 such as a broadband accelerometer is mounted on turret 16; thus a single sensor in a single mounting position can monitor any tool holder position the operator selects for the cutting operation. This mounting location will usually provide a satisfactory signal to noise ratio for spurious noise. Since the turret can be rotated, and in many machines only in one direction, the sensor cannot be electrically connected to stationary signal processing electronics through simple cables. A rotating electrical coupler 22 is one way of transferring the electrical signal outputted by the transducer. Optionally, the vibration sensor 23 is mounted on the cross slide where no rotating coupler is required and tests have shown that good operation is obtained on some lathes. Whether the sensor can be mounted off the turret is a matter that must be experimentally determined on each machine to be monitored.

A vertical turret lathe is illustrated in FIG. 2 and two suitable vibration sensor mounting locations are shown. The parts illustrated are: the machine frame 24, chuck 25, work holding fixture 26, workpiece 27, cross slide 28, vertical slide 29, rotatable tool turret 30, tool post 31, and tool holder and cutting insert 32 (the numerical control unit is not shown). The vibration signal generated by turret-mounted sensor 33 is transmitted through the rotating electrical coupling 34 to the tool break detection circuitry. An alternative mounting location is on one of the machine tool slides; sensor 35 is in good acoustic contact with vertical slide 29.

Figure 3:
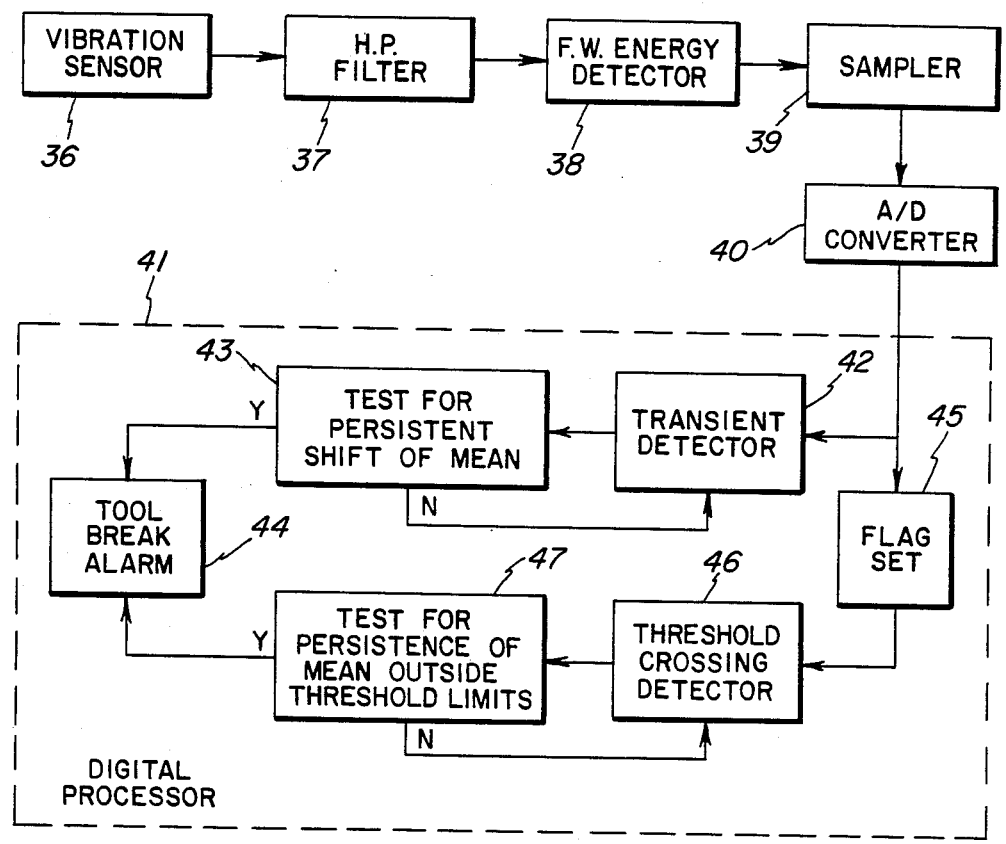
FIG. 3 is a block diagram of the tool break detection system which alarms on both gradual and sudden changes in cutting conditions.

The main features of the tool break detection system which utilizes acoustic vibrations in the 30 to 100 KHz region and employs pattern recognition techniques to distinguish from background noise the effects of tool break events, are indicated in FIG. 3. There is a need to remove machinery noise, and vibrations above 100 KHz are strongly attenuated if the sensor is not on the tool holder. The sensor is a broadband accelerometer 36 with a flat response from very low frequencies to just below its resonant frequency in the vicinity of 30 KHz and above. This resonance is lightly damped, so the sensor is most sensitive to frequencies within a few kilohertz of its resonance, and sensitivity falls rapidly for frequencies much above the resonant frequency. One such high frequency vibration sensor is the Vibra-metric VM1018 accelerometer (Vibra-Metrics, Inc., Hamden, CT). The vibration signal is high-pass filtered in a filter 37 with a cutoff frequency slightly below the resonant frequency of the sensor to discriminate against and attenuate high amplitude machinery noise which tends to be concentrated at lower frequencies. The combination of the resonant accelerometer and the high-pass filter produces a bandpass filtering of the vibration signals that favors frequencies in about a 20 KHz band in the vicinity of the accelerometer resonance frequency.

A full wave rectifier and low-pass filter combination acts as a full wave energy detector 38 (the filtering is too heavy for true envelope detection), converting the bipolar sensor signal to a unipolar "envelope" signal. The cutoff frequency of the low-pass filter is typically 500 Hz or less to prevent aliasing from the subsequent sampling operation as long as the sampling frequency is well above the 1 KHz Nyquist frequency. Thus, the sampling period can be long enough to accomplish the necessary digital analysis of the signal between analog signal samples. The cutoff frequency of the low-pass filter in fact may be as low as 100 Hz. The signal samples of the output of the analog signal processing, extracted by sampler 39, are next converted to digital form by the analog-to-digital converter 40 and are further processed and analyzed by digital circuitry 41, which may be in the form of a programmable general purpose computer.

Figure 4:
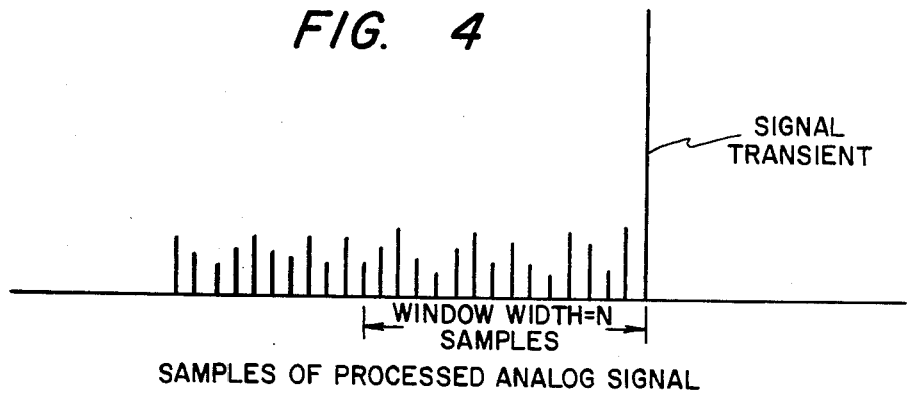
FIG. 4 illustrates the sampled signal presented to the digital processor and the "running mean" window.

According to application Ser. No. 664,188, the analysis of the digitized signal samples is in two basic phases. In the first phase, carried out in transient detector 42, an abrupt, large transient increase or decrease in the vibration signal level is detected, and each detection triggers the second phase. The test for mean shift persistence is performed by circuit 43. If the change in vibration signal level is a short transient, it is rejected in this second phase, and control is returned to the first phase, which resumes looking for abrupt, large changes in mean level. When the change in vibration signal level is persistent, the second phase recognizes this and generates a broken tool alarm 44. The phase 1 transient detection criterion is based primarily on detection of a single signal sample that is either greater or less than the current running mean signal level by a factor great enough to indicate it is probably beyond the range of the normal peaks and valleys of that signal that results from its noise-like character (restricted by the filtering of the analog signal processing channel). Other secondary criteria that must also be met are included to avoid false alarms on low-level transients. Every new signal sample is compared with the mean signal value for the previous N samples, where N is the number of samples in a "running window" used for computing a running mean signal level. FIG. 4 illustrates the digitized samples of the processed analog signal and the "running mean" window. Typically, N would be 16. The presence of an abrupt increase or decrease in the vibration signal may indicate an abrupt change in cutting noise resulting from a change in cutting conditions, and may have its source in a significant tool break event.

The phase 2 level shift persistence criterion continually compares the signal mean level after the trigger with that at the time of the trigger. When the post-trigger mean, after detection of an abrupt signal change, remains outside amplitude acceptance limits for a minimum confirmation period, a tool break alarm is generated. The upper and lower acceptance limits are typically 50% above and below the mean cutting noise signal level. These limits are fixed for a given cut, and are user-selectable and may be put into the parts program. If, at any time during the confirmation period, a specified minimum number of post-trigger means inside the amplitude acceptance limits is accumulated, the detected abrupt transient is rejected as non-tool break related, and control is returned to phase 1.

Large changes in cutting conditions and cutting noise level due to tool break events do not always occur abruptly in a single step increase or decrease, and the total change may take place more gradually or as a series of small abrupt steps. Such major cutting condition changes occurring over a period of time, without regard to the length of that time period, are detected by setting lower and upper cutting noise mean level thresholds. A tool break alarm is generated after a minimum confirmation period. When the mean cutting noise stays below the lower threshold, or exceeds the upper threshold, for a preset number of consecutive signal samples, the alarm is set off. To reduce the probability of false alarms, a flag is set as indicated at 45 in FIG. 3, activating the lower threshold test done by threshold crossing detector 46 (the high level test is always active). The test for persistence of the mean signal level outside the break detection threshold limits is performed by circuitry 47.

The accelerometer output signal after processing in the analog signal channel may sometimes have the characteristics shown in FIG. 5 when the tool insert breaks in a series of small breaks, rather than in one large break. The signal level of processed vibration signal 48 drops abruptly at (1), (2) and (3), each drop being associated with a small tool break event. The drop in signal level at any one event is too small to meet the abrupt signal level change tool break detection criterion, which is set to ignore the individually insignificant tool break events. However, the total effect of the three tool break events is significant and it is desirable to generate a tool break alarm. When the processed signal level mean value drops below the preset lower break detection threshold 49, shortly after the signal level itself crosses the threshold at point TC, the tool break detector starts counting signal samples. The mean signal level remains below the threshold for a minimum confirmation period, long enough for a preset consecutive number of signal samples, 10 samples in the figure, to be counted. This meets the tool break detection criteria and a tool break alarm is generated. If the persistence test is failed, control is returned to threshold crossing detector 46.

The tool break detection technique illustrated in FIG. 5 can give false tool break alarms under three situations against which protection is provided. One potential false alarm situation is the end of a cut, where the sensor signal mean level always decays below the break detection threshold 49. This problem is avoided simply by programming the machine control to ignore tool break alarms generated outside a time window which extends from the start of the cut to just before the cut ends, causing end of cut alarms to be ignored.

A second potential false alarm situation can arise if the system gain is set too low, so that the signal mean level can fall below the lower break detection threshold during normal cutting operations without tool breaks. This problem is avoided by activating the lower break detection threshold 49, and threshold crossing detector 46, only after a flag has been set. As shown in FIG. 6, this flag is set when the mean signal level of processed vibration signal 50 rises above a flag-set threshold level 51 and remains there for a preset number of consecutive signal samples. The illustrated confirmation window is 4 samples. This prevents lower threshold alarms on low signals near the start of the cut before the cutting noise signal level builds up and initial runout conditions are passed. The flag-set threshold 51 is much higher than the lower limit threshold 49, which is just above the normal continuous traverse noise level when the tool is out of contact with the workpiece. It is typically one-half of the background cutting noise level at full depth of cut.

The third potential false alarm situation occurs when cutting a rough surface where the depth of cut may change abruptly, and even go to zero, when the tool goes from a high spot to a low spot on the rough rotating surface of the workpiece. Since the tool will return to a high spot at least once every rotation of the spindle-mounted workpiece, false alarms from this source can be avoided simply by setting the required number of consecutive signal samples with mean signal below the tool break detection threshold 49, 10 in FIG. 5, greater than the number of samples occurring in one revolution of the machine tool spindle.

Tool break events sometimes cause the mean processed sensor signal level to increase, as in FIG. 7, rather than decrease, as in FIGS. 5 and 6. This can happen, for example, if a piece broken from the tool insert becomes jammed against the workpiece, increasing the depth of cut. Such signal increases are usually large enough and abrupt enough to meet the signal transient tool break detection criteria and trigger transient detector 42. However, occasionally this may not be the case because the normal cutting signal level of processed vibration signal 52 is too close to the system saturation level 53. As shown in FIG. 7, an upper break detection threshold 54 is set just below saturation level 53. When the mean signal level crosses this threshold at point TC, and exceeds the threshold for a minimum confirmation period, for a preset number of consecutive signal samples, a tool break alarm is generated, even if the signal transient detection criteria are not met.

The gradual "edge crumble" break or step break which produce the type of break signature in FIGS. 5 and 6 are rare under most machining conditions, but occur frequently under a few conditions that often represent poor practice but are used anyway for reasons of expediency. The crumble break detection feature is made to be easily activated and deactivated so that the user can restrict its use to those few machining conditions where it is found to be needed. Exceeding the upper limit threshold and producing an alarm on very high signal levels, FIG. 7, is a situation that occurs rarely but has been seen in some tests.

This tool break detector system is readily integrated with the acoustic tool touch detector of application Ser. No. 645,203, filed Aug. 29, 1984, C. E. Thomas et al., "Acoustic Detection of Contact Between Cutting Tool and Workpiece", in a combined tool break and touch detection system. The sensor and the analog signal processing are the same and the fundamental difference resides in how the digitized signal samples are analyzed and the nature of the pattern recognition logic. The improved acoustic broken tool detector may be used with an automatic tool changing system, and as a stand-alone product or an option in a numerical machine tool control.

While the invention has been particularly shown and described with reference to preferred embodiments thereof, it will be understood by those skilled in the art that various changes in form and details may be made without departing from the spirit and scope of the invention.

What is claimed is:

1. An acoustic monitoring system to detect cutting tool break events while machining a workpiece on a machine tool comprising:
    a broadband vibration sensor which generates an electrical signal representing vibrations at the tool-workpiece interface;
    an analog preprocessor including means to discriminate against lower frequency machinery noise and to detect the signal energy in an acoustic frequency band below 100 KHz;
    means for sampling the output signal of said analog preprocessor and converting each sample to a digital value;
    digital pattern recognition circuitry to detect tool break events that produce gradually occurring, substantial changes in cutting conditions, comprising means for calculating the running mean signal level of N samples, means for determining when the cutting noise and mean signal level drops below a lower break detection threshold which is just above the continuous traverse noise level of said machine tool, and means for generating a tool break alarm after counting a preset number of low level cutting noise samples below the lower threshold.

2. The system of claim 1 and means for setting a flag and activating the lower break detection threshold only after said mean signal level rises above a much higher flat-set threshold and remains there for a preset number of consecutive signal samples.

3. The system of claim 2 and means for determining when the mean signal level exceeds an upper break detection threshold just below the system saturation level and generating a tool break alarm after counting a preset number of very high cutting noise samples above the upper threshold.

4. The system of claim 2 wherein said vibration sensor is an accelerometer which has a resonant frequency above 30 KHz.

5. The system of claim 2 wherein, to prevent false alarms on rough surface cutting, the number of low level cutting noise samples to alarm is set at least equal to the number of samples in a machine tool spindle revolution.

6. An acoustic monitoring system to detect cutting tool break events while machining a workpiece comprising:
    a broadband accelerometer which is most sensitive to frequencies around a resonant frequency and is positioned on a machine tool to sense vibrations at the tool-workpiece interface and convert these and other vibrations to an electrical signal;
    analog signal processing means including means for high-pass filtering said vibration signal to discriminate against lower frequency machinery noise, and means to rectify and low-pass filter said signal to detect the signal energy in an acoustic frequency band between 30 KHz and 100 KHz;
    means for sampling the unipolar output signal of said analog processing means and converting each sample to digital form;
    a digital processor to detect major cutting condition changes occurring gradually over a period of time that can damage the workpiece or machine tool;
    said digital processor comprising means for calculating the running mean signal level of a selected number of samples, means for activating the lower threshold test of a threshold crossing detector after the mean signal level rises above a much higher flag-set threshold and remains there for a preset number of consecutive signal samples, said detector determining when the mean signal level crosses lower or upper break detection thresholds where the former is just above the continuous traverse noise level of said machine tool and the latter is just below the system saturation level, and means for testing that the mean signal level persistently remains outside of said thresholds, and generating a tool break alarm.

7. The system of claim 6 wherein said last-mentioned means returns control to said threshold crossing detector after failing the persistence test.

8. The method of acoustically detecting tool breakage capable of damaging the workpiece or machine tool comprising:

sensing vibrations at the tool-workpiece interface and converting these and other machine tool vibrations to an electrical signal;

preprocessing said vibration signal to discriminate against lower frequency machinery noise and rectify and low-pass filter said signal to detect the signal energy in an acoustic frequency band below 100 KHz;

sampling the processed vibration signal and converting each sample to digital form; and analyzing said signal samples to detect gradually occurring, but substantial, cutting noise changes due to tool break events capable of damage, comprising setting upper and lower cutting noise thresholds, determining when the running mean signal level of N samples drops below said lower threshold, which is just above the continuous traverse noise level of said machine tool, and generating a tool break alarm after a preset number of consecutive signal samples and the cutting noise are outside of said thresholds.

9. The method of claim 8 and activating said lower threshold after a much higher flag-set threshold is exceeded by a preset number of consecutive signal samples, to prevent false alarms on low level signals such as those near the start of the cut.

10. The method of claim 9 and preventing false alarms during rough surface cutting by setting the number of consecutive signal samples below the lower threshold, needed to generate an alarm, larger than the number of samples in a machine tool spindle revolution.

* * * * *